A. H. NIELSEN.
EGG TURNING DEVICE FOR INCUBATORS.
APPLICATION FILED FEB. 20, 1914.
1,107,201.
Patented Aug. 11, 1914.
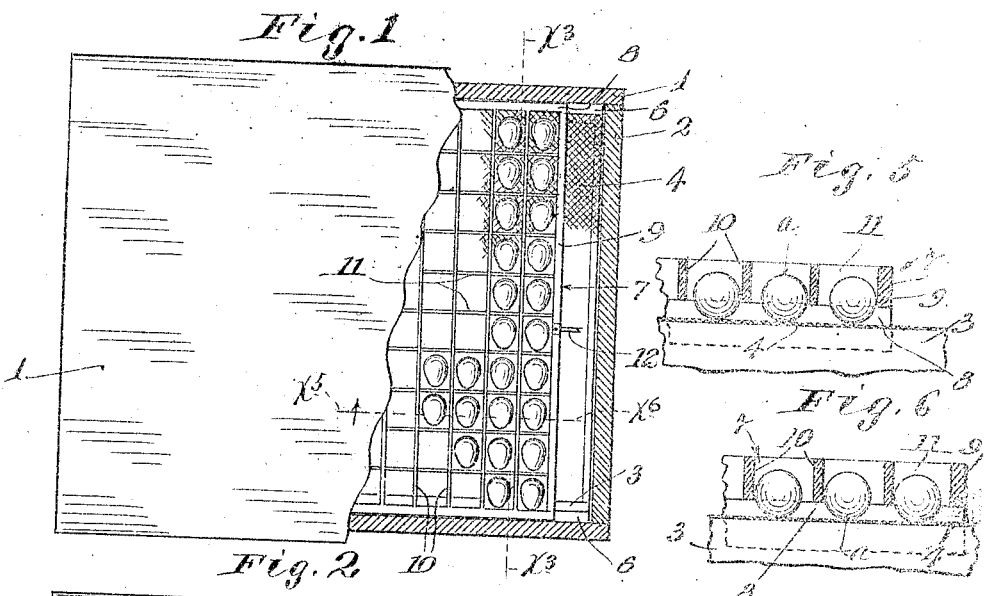
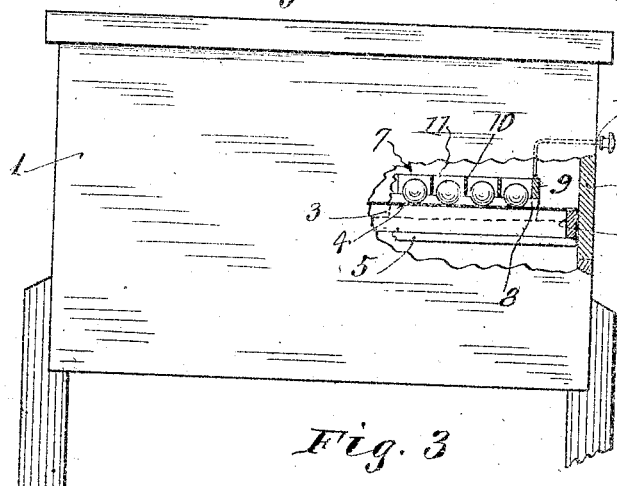
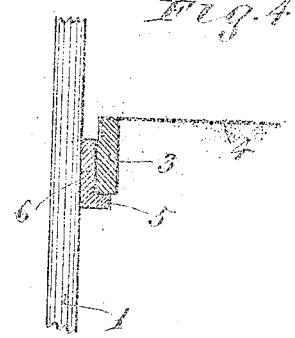
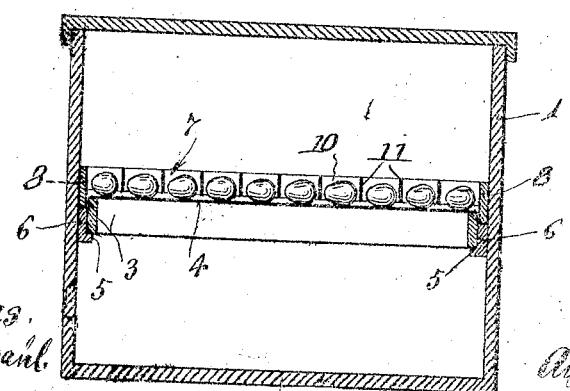
Witnesses
A. H. Opsahl
E. C. Skinkle
Inventor
Alfred H. Nielsen
By his Attorneys
Williamson Merchant

UNITED STATES PATENT OFFICE.

ALFRED H. NIELSEN, OF MINNEAPOLIS, MINNESOTA.

EGG-TURNING DEVICE FOR INCUBATORS.

1,107,201.

Specification of Letters Patent. Patented Aug. 11, 1914.

Application filed February 20, 1914. Serial No. 819,869.

*To all whom it may concern:*

Be it known that I, ALFRED H. NIELSEN, a citizen of the United States, residing at Minneapolis, in the county of Hennepin and State of Minnesota, have invented certain new and useful Improvements in Egg-Turning Devices for Incubators; and I do hereby declare the following to be a full, clear, and exact description of the invention, such as will enable others skilled in the art to which it appertains to make and use the same.

My invention has for its object to provide an extremely simple and highly efficient device for turning or rolling eggs held on the trays of incubators, or the like, and to such ends, generally stated, the invention consists of the novel devices and combinations of devices hereinafter described and defined in the claim.

In the accompanying drawings which illustrate the invention, like characters indicate like parts throughout the several views.

Referring to the drawings: Figure 1 is a view chiefly in plan but with some parts in horizontal section showing an incubator with my improved egg turning device applied therein; Fig. 2 is a front elevation of the parts shown in Fig. 1, some parts being broken away; Fig. 3 is a transverse vertical section taken on the line $x^3$ $x^3$ on Fig. 1; Fig. 4 is a fragmentary view taken in section on the same line as Fig. 3, but showing the parts on a larger scale, and with the eggs and egg turner removed from the egg tray; and Figs. 5 and 6 are vertical sections taken on the line $x^5$ $x^6$ on Fig. 1, illustrating the manner in which the eggs are rolled by movements of the egg turner.

The numeral 1 indicates the body of an incubator of standard or ordinary construction, the same, as shown, having a front door 2 hinged at its lower edge, and when opened, permitting the insertion or removal of the egg tray. The egg tray comprises a marginal frame 3 and wire netting 4 in the usual arrangement, the sides of the said frame 1 being slidably mounted on the inwardly projecting flanges or cleats 5 of supporting rails 6, which latter are secured to the inner surfaces of the side walls of the incubator.

The egg turning device is in the form of a cellular bottomless rack 7, the side bars 8 of which extend considerably below the lower edge of the end bars 9 of all of the other bars of said rack, so that they are adapted to rest upon the upper edges of the rails 6 and support the lower edges of the end bars 9 and the other bars of the said rack considerably above the surface of the tray screen.

In the construction illustrated, the turning rack is provided with a cell for each egg, but this is not necessary, and in some instances, would not be desirable. The transverse bars 10 of the rack 7 should be spaced apart only far enough to contain one layer of eggs between them, but the longitudinal intermediate bars 11 or part thereof, might be dispensed with. The length of the rack, that is the dimensions thereof, from near to front of the incubator, should be considerably less than the corresponding internal dimension of the incubator, so that by forward and rearward movements of the rack, the eggs may be caused to roll and make approximately a one-half rotation. For example, Fig. 5 shows the rack pushed in and the points marked $a$ on the eggs, upward, while Fig. 6 shows the rack moved outward or forward, and the points $a$ on the eggs turned downward into contact with the screen of the supporting tray. The hot air from the incubator, as is well known, passes upward through the screen of the tray into contact with and around the eggs.

It is the customary practice, in the process of incubation, to turn the eggs over once or twice each day. When this is done in the usual way by hand, the egg tray must first be removed from the incubator and then the eggs rolled around by hand, or turned over by hand after quite a large number of the eggs have first been removed from the tray. In thus turning the eggs by hand, it is never certain just how much the eggs are turned and a great many thereof, will be rolled so far that the same sides will again be turned downward. By the use of my improved egg turning rack, all of the eggs are given like rotations and may be accurately turned over, simply by moving the rack to a backward or inward position at one time, and the next time moving the same outward and leaving it in that position. The turning rack, so-called, may be made of any suitable material, but will preferably be made from light strips of wood. With the lower edges of all of the bars of the rack which are over the screen of the egg tray, raised above the said screen, as described, even distribution and proper circulation of the hot air between and around the eggs is not interfered with.

To make it possible to move the egg turning rack from one position to another without opening up the incubator, it is preferably provided with an extended operating rod 12 that projects through an opening either in the door or in the wall of the incubator, or egg containing casing.

The egg turning device described may also be used in connection with storage receptacles or casings in which eggs are kept while they are being accumulated for hatching purposes, and at such times, they should be turned over daily.

Obviously, the egg turning rack may be constructed at very small cost and is not only labor saving, but makes objectionable handling of the eggs unnecessary and insures accurate turning of the eggs.

What I claim is:

The combination with a casing having tray-supporting rails and an egg-supporting tray removably mounted on said rails, of an egg-turning rack having depending side bars that rest upon said rails, supporting the other bars of said rack above said tray, and capable of shifting movements within said casing, to roll the eggs.

In testimony whereof I affix my signature in presence of two witnesses.

ALFRED H. NIELSEN.

Witnesses:
 HARRY D. KILGORE,
 F. D. MERCHANT.